US009809264B1

(12) United States Patent
Talke et al.

(10) Patent No.: US 9,809,264 B1
(45) Date of Patent: Nov. 7, 2017

(54) TRACK KIT FOR TWO WHEELED BALANCING GROUND VEHICLE

(71) Applicants: Kurt A. Talke, San Diego, CA (US); Aaron Bruce Burmeister, La Mesa, CA (US); Anthony Douglas Jones, San Diego, CA (US)

(72) Inventors: Kurt A. Talke, San Diego, CA (US); Aaron Bruce Burmeister, La Mesa, CA (US); Anthony Douglas Jones, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 234 days.

(21) Appl. No.: 14/734,817

(22) Filed: Jul. 20, 2015

(51) Int. Cl.
*B62D 55/04* (2006.01)
*B62D 55/084* (2006.01)
(Continued)

(52) U.S. Cl.
CPC ........... *B62D 55/04* (2013.01); *B62D 55/084* (2013.01); *B62D 55/14* (2013.01); *B62D 55/32* (2013.01); *G05D 1/0891* (2013.01)

(58) Field of Classification Search
CPC .... B62D 55/04; B62D 55/075; B62D 55/084; B62D 55/32; B62D 55/10; B62D 55/104;
(Continued)

(56) References Cited

U.S. PATENT DOCUMENTS 3,207,562 A 9/1965 Ewing
3,774,706 A 11/1973 Kiekhaefer
(Continued)

FOREIGN PATENT DOCUMENTS

CA 2356126 A1 5/2002
WO WO 2014179855 * 5/2014 ............... A61F 5/01

OTHER PUBLICATIONS

Siddiqui, Edrees, et al., "SPAWAR Segway Tracked Robot", https://sites.google.com/site/ryanlinmechanicalengineering/projects/spawar-segway-tracked-robot, Winter 2012.
(Continued)

*Primary Examiner* — Joseph M Rocca
*Assistant Examiner* — Maurice L Williams
(74) *Attorney, Agent, or Firm* — SSC Pacific Patent Office; Arthur K. Samora; Kyle Eppele

(57) ABSTRACT

A dynamically balanced, tracked robot, which can switch between dynamically balanced (wheeled) operation and tracked operation, can include a body and at least one wheel rotatably mounted to the body. At least one strut can also be mounted to the body so that it extends therefrom, and an idler wheel can be fixed to the distal end of the strut. A track can be slipped over the wheel and that idler wheel, so that the track frictionally engages both the wheel and the idler wheel. The robot can have a defined vertical reference vector and a processor. The processor can have non-transitory written instructions that, when accomplished, cause the vertical reference vector to be parallel with a vector defined by the robot axis and the revised post-installation center of gravity, to continue to allow for dynamic balancing of the newly-tracked robot.

3 Claims, 5 Drawing Sheets

(51) Int. Cl.
*B62D 55/14* (2006.01)
*B62D 55/32* (2006.01)
*G05D 1/08* (2006.01)

(58) Field of Classification Search
CPC ........ B62D 55/14; B62D 37/00; B62D 61/12;
A63H 15/06; G05D 1/0891; A61G 5/061;
A61G 5/066; Y10T 16/3837
See application file for complete search history.

(56) References Cited

U.S. PATENT DOCUMENTS

| | | | | |
|---|---|---|---|---|
| 4,459,932 A * | 7/1984 | Hildebrand | ............... | B60F 3/00 180/9.26 |
| 5,330,019 A * | 7/1994 | Cartwright | ............. | B62D 55/04 180/9.21 |
| 5,855,248 A * | 1/1999 | Rawson | ................. | B62D 55/04 180/9.21 |
| 5,860,486 A * | 1/1999 | Boivin | ................. | B62D 55/108 180/190 |
| 6,066,026 A * | 5/2000 | Bart | ........................ | A63H 15/06 180/6.2 |
| 6,422,576 B1 * | 7/2002 | Michaeli | ................ | B62D 55/02 180/9.32 |
| 6,431,301 B1 | 8/2002 | Forbes | | |
| 6,615,939 B1 * | 9/2003 | Karales | ................. | B62D 55/04 180/9.21 |
| 6,648,722 B2 * | 11/2003 | Lynders | ............... | A63H 17/004 446/437 |
| 6,945,342 B1 | 9/2005 | Hill | | |
| 7,188,694 B1 * | 3/2007 | Blair | ....................... | B60B 19/06 180/218 |
| 7,348,747 B1 * | 3/2008 | Theobold | ................ | B25J 5/005 318/568.11 |
| 7,494,398 B2 * | 2/2009 | Laurienzo | ............ | A63H 17/008 446/454 |
| 7,600,592 B2 * | 10/2009 | Goldenberg | ......... | B62D 55/075 180/8.1 |
| 8,240,408 B2 | 8/2012 | Bernard et al. | | |
| 8,490,723 B2 * | 7/2013 | Heinzmann | .......... | B62K 11/007 180/218 |
| 8,622,159 B2 * | 1/2014 | Jacobs | ................. | B62D 55/075 180/9.32 |
| 8,695,735 B2 | 4/2014 | Afanador | | |
| 9,487,253 B2 * | 11/2016 | Behrens | ................... | A61G 5/04 |
| 9,567,021 B2 * | 2/2017 | Mailey | ................. | B62D 55/075 |
| 9,676,430 B2 * | 6/2017 | Mattson | ................ | B62D 55/084 |
| 2005/0011686 A1 * | 1/2005 | McIlwraith | .......... | B62D 55/242 180/9.26 |
| 2005/0127752 A1 * | 6/2005 | Spector | ................... | A61G 5/061 305/126 |
| 2007/0209844 A1 * | 9/2007 | Kamimura | ......... | B62D 55/0655 180/9.32 |
| 2008/0105481 A1 * | 5/2008 | Hutcheson | ............... | B25J 5/007 180/209 |
| 2008/0230285 A1 * | 9/2008 | Bewley | .................. | B62D 37/00 180/8.4 |
| 2008/0265821 A1 * | 10/2008 | Theobald | ................. | B25J 5/005 318/568.12 |
| 2010/0057319 A1 * | 3/2010 | Inaji | ..................... | G05D 1/0891 701/70 |
| 2011/0036650 A1 * | 2/2011 | Simula | ................. | B62D 55/065 180/9.44 |
| 2012/0073886 A1 * | 3/2012 | Couture | ................... | B25J 5/005 180/8.1 |
| 2012/0215355 A1 * | 8/2012 | Bewley | ................... | B25J 5/005 700/258 |
| 2014/0097029 A1 * | 4/2014 | Fukumoto | ............. | B62D 55/02 180/9.34 |

OTHER PUBLICATIONS

Unknown, "Balancing Tracked Robot with LabVIEW", https://www.youtube.com/watch?v=6Gh40NUk6fg,Jun 24, 2011.
Morozovsky, Nicholas et al., "Switchblade: An Agile Treaded Rover", IEEE/RSJ International conference on Intelligent Robots and Systems 2011, Oct. 25, 2011.
Morris, Laura, "MiP is a Balancing Robot That Works With Your Smartphone", http://www.eejournal.com/archives/fresh-bytes/mip-is-a-balancing-robot-that-works-with-your-smartphone/, Jan. 9, 2014.
Unknown, "Unusual Off-Road Locomotion", http://ww.unusual-locomotion.com/pages/more-documentation/tracked-and-snak-like-rob . . . , 1999-2012.
Jelinik, Michal, "This Winter Will Be Hot—Tracked Segway Like Vehicle", http://www.coroflot.com/mikedee/this-winter-will-be-hot-tracked-segway-like-vehicle, Oct. 7, 2010.
Coxworth, Ben, "Timbersled's Mountain Horse Kit Converts Motorbikes Into Snow Machines", http://www.gizmag.com/timbersled-mountain-horse-snow-motorbike/30831/, Feb. 13, 2014.

* cited by examiner

TRACK KIT FOR TWO WHEELED BALANCING GROUND VEHICLE

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103290.

REFERENCE TO PRIOR PROVISIONAL APPLICATION

This application claims the benefit of U.S. Provisional Application No. 62/053,875, filed Sep. 23, 2014. The contents of the '875 application are hereby incorporated by reference herein.

FIELD OF THE INVENTION

The present invention pertains generally to ground vehicles. More particularly, the present invention pertains to ground vehicles that use a dynamic balancing approach to achieve stability during operation. The present invention can be particularly, but not exclusively, useful as a ground robot and a conversion kit therefor, which can be used to convert a dynamically balanced robot to a tracked robot while maintaining the robot's dynamic balancing capability.

BACKGROUND OF THE INVENTION

Robotic platforms are ubiquitous in today's society for performing a plethora of functions, and they are particularly advantageous for safely performing functions that could be dangerous to human beings. Some of these functions can include Explosive Ordinance Disposal, where a variety of robotic tools and techniques can be used advantageously. For these robots (and really for all robots), stability can always be a concern, as robotic systems can overturn during normal use. Overturning can temporarily incapacitate the system, and in some cases can cause permanent damage to the system and its payloads. The tip-over issue can sometimes be addressed by lowering the center of gravity of the robot, by establishing a large base with a lot of weight, so that the system is unlikely to overturn, or tip-over. These types of robots typically have a tracked chassis. The tracks can enable the robot to traverse a wider range of terrain and carry more versatile payloads than would be practical using its original wheels. But this approach can also require more power due to the robot weight, and this approach can also sacrifice mobility.

Other robotic platforms approach stability from a dynamic balancing approach, in which a high center of gravity allows for motors with proper torque and a feedback mechanism to dynamically balance the platform in a vertical manner, which can be similar to the way one can maintain balance when riding a unicycle. Robots that could combine these two concepts, a tracked platform and a dynamic balancing platform, could be extremely advantageous. Tracked platforms are known in the art where the tracks can re-orient into a balancing mode or a stable driving mode depending on the desired method of movement. But these systems must be configured in a tracked or wheeled mode prior to operation of the system, and once these systems are operating, they mode of operation cannot be changed. Other similar systems have potentially been developed, but nothing which mechanically converts an existing two-wheeled balancing platform into a tracked platform with dynamic balancing capabilities is known in the prior art.

Still further, in some instances balancing vehicles can be used as the basis for the design, as stability augmentation is already included in the base system. For these situations, it may be desirable to convert the balancing vehicle into a tracked balancing vehicle by making the track kit a readily installable accessory. Such a system can benefit from the advantages of a tracked robotic system as well as the stability control of an established balancing vehicle. The conversion kit can also save money, as alternate purpose-built tracked robotic platforms can be far more expensive when designed and manufactured from scratch, and can require additional development to implement control-system-based tip over prevention.

In view of the above, it can be an object of the present invention to provide a balancing robot, which can be converted to a tracked robot while still maintaining its ability to dynamically balance. Another object of the present invention can be to provide a kit for converting wheeled balancing robots to tracked balancing robots, to take advantage of the greater traction gained by adding the tracks, without sacrificing the dynamic balancing aspect of the robot. Still another object of the present invention can be to provide a tracked balancing robot that can switch between wheeled motion and tracked motion during the operation of the robot. Another object of the present invention can be to provide a tracked balancing robot that can autonomously reduce the tendency for the robot to tip over forward or backward. A further object of the present invention can be to provide a kit for converting a wheeled balancing robot, to a tracked balancing robot, which can easily be removed to allow the system to be quickly returned to its original wheeled configuration as mission demands change. Another object of the present invention to provide a balancing tracked robot, and conversion kit therefor, which can be easy to manufacture, and which can be used in a cost-efficient manner by converting commercial-of-the-shelf robots, which are already being manufactured using economies of scale.

SUMMARY OF THE INVENTION

A dynamically balanced, tracked robot, which can switch between wheeled operation and tracked operation during operation of the robot in accordance with several embodiments of the present invention, can include a body (chassis) and at least one wheel rotatably mounted to the body. At least one strut can also be mounted to the body so that it extends therefrom (in some embodiments, the strut can be hingedly mounted to the chassis), and an idler wheel can be fixed to the distal end of the strut. A track can be slipped over the wheel and that idler wheel, so that the track frictionally engages both the wheel and the idler wheel.

To allow for smooth transition between tracked operation and wheeled (dynamically balanced) operation, the feedback systems for the robot can have a defined vertical reference vector. The robot can further include a processor, which can have non-transitory written instructions that, when accomplished, can account for the change in center of gravity due to installation of the kit, and that cause the track vertical reference vector to start at the wheel axis and pass through the revised center of gravity, in order to cause the reference vector to be in parallel with the vertical during dynamically balanced operation.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
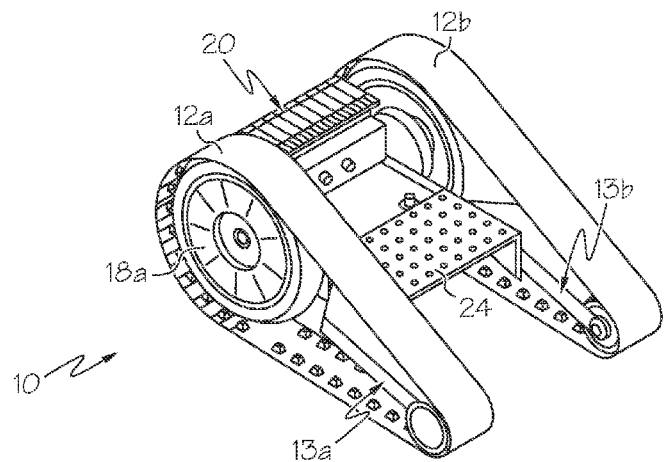
FIG. 1 is a side elevational view of the assembled tracked balancing robot of the present invention according to several embodiments.
Figure 2:
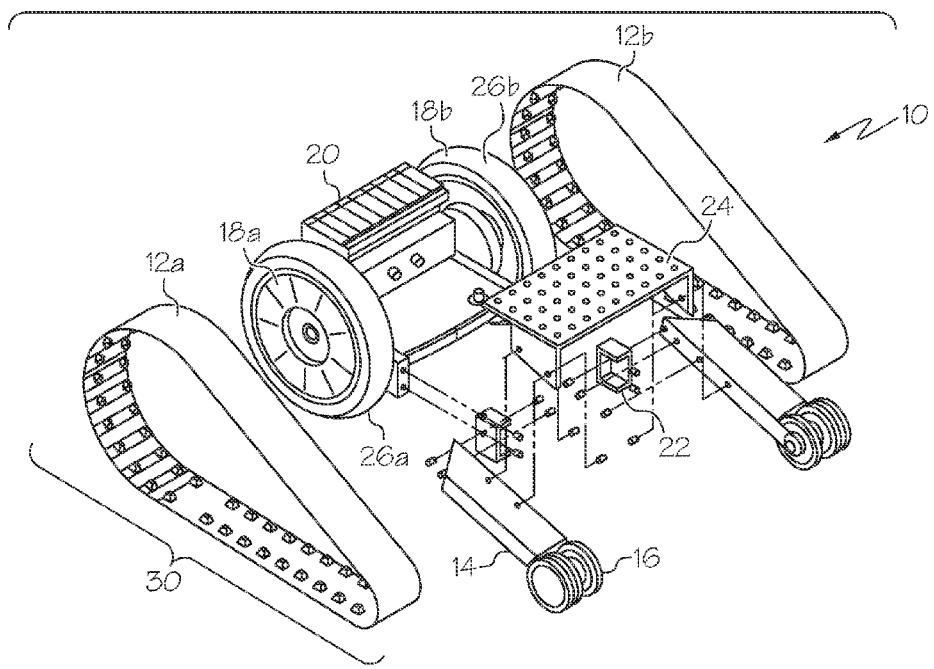
FIG. 2 is an exploded side elevational view of the tracked balancing robot of FIG. 1.

Referring initially to FIGS. 1-2, a dynamically balanced tracked robot in accordance with several embodiments of the present invention is shown and is generally designated by reference character 10. The robot 10 can include at least one track 12. In FIGS. 1-2, tracks 12a, 12b are shown. The robot 10 can further include a corresponding idler assembly 13 (the structure of idler assembly 13 is shown in more detail in FIGS. 3-4 and described more fully below). Each track 12 can be placed around a corresponding idler assembly 13 (which can further include a strut 14 and idler 16), as well as around the original wheel 18 of the original chassis 20 (in this Specification, the terms "body" and "chassis" are used interchangeably). As shown in FIG. 2, the struts 14 can be attached to a bracket 22, which can be attached to the original chassis 20. A payload deck 24 can also be attached to the chassis in several embodiments of the present invention. The fully assembled system can be seen in FIG. 1.

Figure 3:
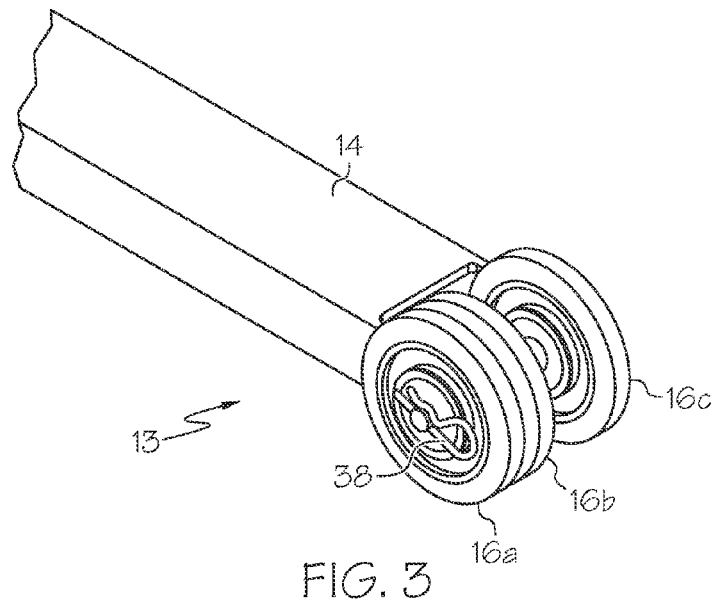
FIG. 3 is a side elevational view of the strut for the conversion kit embodiments of the robot of FIG. 2.
Figure 4:
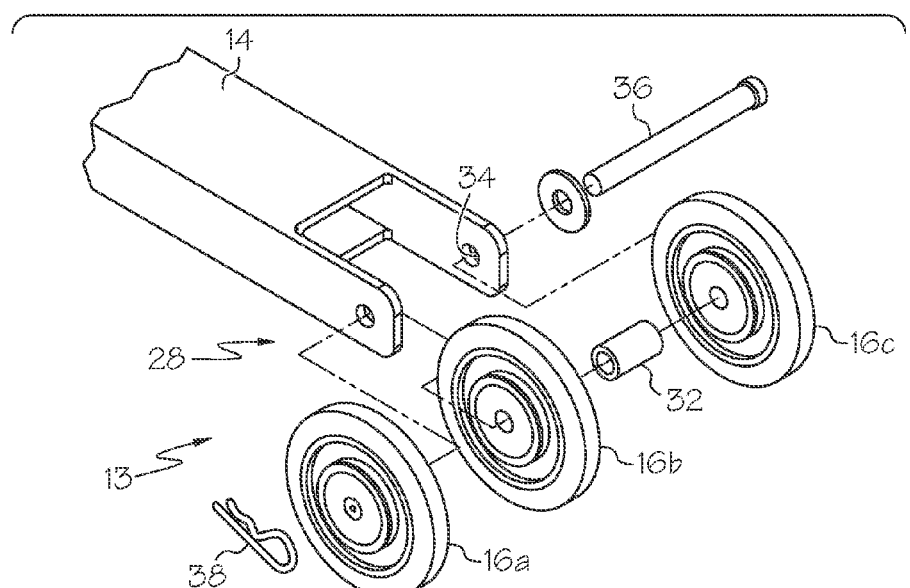
FIG. 4 is an exploded side elevational view of the strut of FIG. 3.

Referring now to FIGS. 2-4, the structure of the conversion kit 30 can be seen in greater detail. As shown, the conversion kit 30 can include a respective track 12 and idler assembly 13. Each idler assembly 13 can have a strut 14, which can terminate at a u-shaped distal end 28. The idler assembly 13 can further comprise three idler wheels 16a-c and track 12 (for clarity, track 12 is not shown in FIGS. 3-4, please see FIG. 1). Idler wheels 16b and 16c can be placed inside u-shaped distal end 28, and separated by spacer 32, while the third idler wheel 16a can be positioned in alignment with idler wheels 16b and 16c and holes 34 in u-shaped distal end 28, but outside of strut 14. An axle pin 36 can be inserted through holes 34, idler wheels 30 spacer 32 and secured with a cotter pin 38 or similar type of fastener, to thereby fix the idler assembly in place, so the idler wheels 30 may freely rotate. FIGS. 3-4 show the idler strut assembly ready for installation and exploded, respectively. It should be appreciated, however, that different idler configuration and orientations can be installed to accommodate varying track/idler types.

The original chassis 20 can be a commercial-off-the-shelf (COTS) item. When converting the original dynamically balanced COTS item to a tracked balancing system, i.e., to install the tracks, both tires 26 on wheels 18 can be deflated. The mounting brackets 22a, 22b of idler assemblies 13a, 13b can be bolted to the original chassis 20 to accommodate the track assembly. The struts 14a, 14b can be bolted to respective brackets 22a, 22b, and the tracks 12a, 12b can then be stretched over the deflated tires 26a, 26b and positioned so that they extend behind the robot 10 so that the idlers 16a, 16b frictionally engage the inside of stretched out track 12, to apply some initial tension to the tracks 12. Next, the payload deck 24 can be bolted to the original chassis 20 between the idler struts 14. The vehicle tires 26a, 26b can be re-inflated, which can increase the tension in tracks 12, and to increase the frictional engagement between the tracks 12, the tires 26 and the idlers 16 to a desired operational level.

Figure 5:
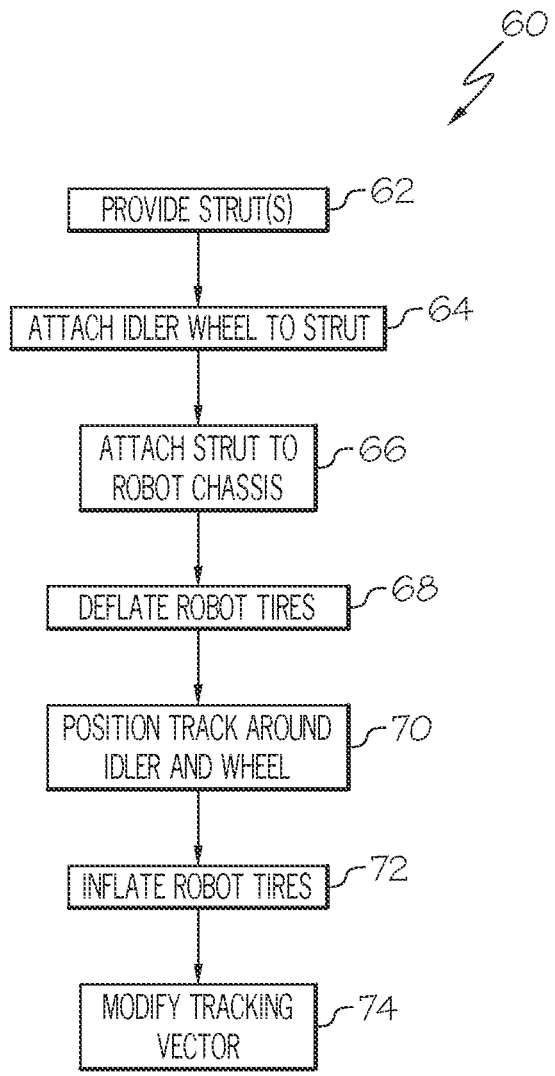
FIG. 5 is a block diagram that illustrates steps which can be taken to practice the methods of the present invention according to several embodiments.

Referring now to FIG. 5, a block diagram, which illustrates steps that can be taken to practice the methods of the present invention according to several embodiments is shown and is generally designated by reference character 60. As shown, method 60 can include the initial step 62 of providing a strut 14. As shown by block 64, the methods can also include the step of attaching at least one idler wheel 16 to the distal end of each respective strut 14 that has been provided in step 62. Next, the proximal end of the strut 14 can be fixed to the robot chassis 20, as indicated by step 66 in FIG. 5.

The methods according to several embodiments can further include the step of deflating the robot tires 26, as shown by step 68 in FIG. 5. Once this occurs, the track 12 can be placed around the wheel 18 and the idler wheel 16 as depicted by box 70, and the robot tires 26 can be inflated, as shown by box 72 in FIG. 5. The robot is now ready for tracked operation. The installation of the track kit assemblies 13 can greatly increase the mobility of the balancing robotic platform 10 over difficult terrain conditions. On the other hand, because the track kit struts 14 extend in only one direction from the original base platform tires 26, the ability to dynamically balance can be maintained, while also increasing the overall stability, giving the platform robot 10 the ability to drive as a rigid tracked platform when balancing is not required. During operation of the robot 10, the tracks can engage the ground.

For the present invention according to several embodiments, a hybrid balance/track mode could be enabled in which the robot could balance on its "nose" and drive around with the idler wheels in the air. As the robot decelerates, the decelerating motion of the robots can cause the struts to pivot away from the ground, so that the only portion of the tracks 12 that contacts the ground is that portion which also contacts the wheels 18. There are several embodiments which can accomplish this pivoting action of idler assembly 13 (and track) away from the ground. For example, the strut 14 for idler assembly 13 can be hingedly attached to bracket 22 (or bracket 22 could be alternatively attached to original platform 20. Alternatively, payload deck 24 can be installed at an angle θ from the horizontal, to cause the pivoting action, which further causes the shift into dynamic balancing mode. Still further, the feedback circuits could be modified to account for the additional weight of the newly-installed tracks 12, idler assemblies 13 and payload deck 24. All of these embodiments could be used to take advantage of the dynamic balancing feedback structure of the device, which can then be maintained while the robot is moving at the desired velocity. This hybrid configuration could increase battery life when the user does not need the full traction of the entire track on the ground and further give the robot a higher vantage point for line-of-sight cameras or other sensors.

Figure 6A:
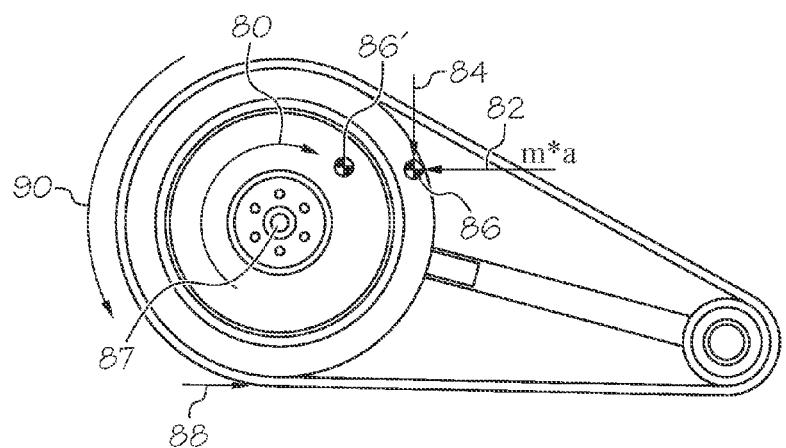
FIG. 6A is a free body diagram which illustrates the forces acting on the robot of FIG. 1 during tracked operation.

To maintain the ability for the newly-tracked robot to maintain its dynamically balancing capability during the hybrid balance/tracked mode, the feedback system for the robot must be modified. One way to modify the feedback system can to modify the tracking vector to account for the change in the center of gravity of the robot 10 due to installation of the kit, as indicated by box 74 in FIG. 5. To appreciate how this might be accomplished, and referring now to FIGS. 6A and 6B, a free body diagram of the robot 10 is shown. As shown in FIG. 6A, the robot motor (not shown) can cause a torque (depicted by arrow 80), and can further cause an acceleration force in the direction indicated by arrow 82. Both acceleration force 82 and gravity 84 work through the robot center of gravity, 86. But, the center of gravity has shifted slightly (the shift is exaggerated in FIG. 6A) from pre-installation center of gravity 86' to post-installation center of gravity 86. Under sufficient acceleration, the robot's inertia, acting through post-installation center of gravity 86 can cooperate with friction force 88 to cause a couple (indicated by net pitching moment 90) that raises the struts 14 to the vertical. This vertical dynamically balanced mode is indicated in FIG. 6B.

Figure 6B:
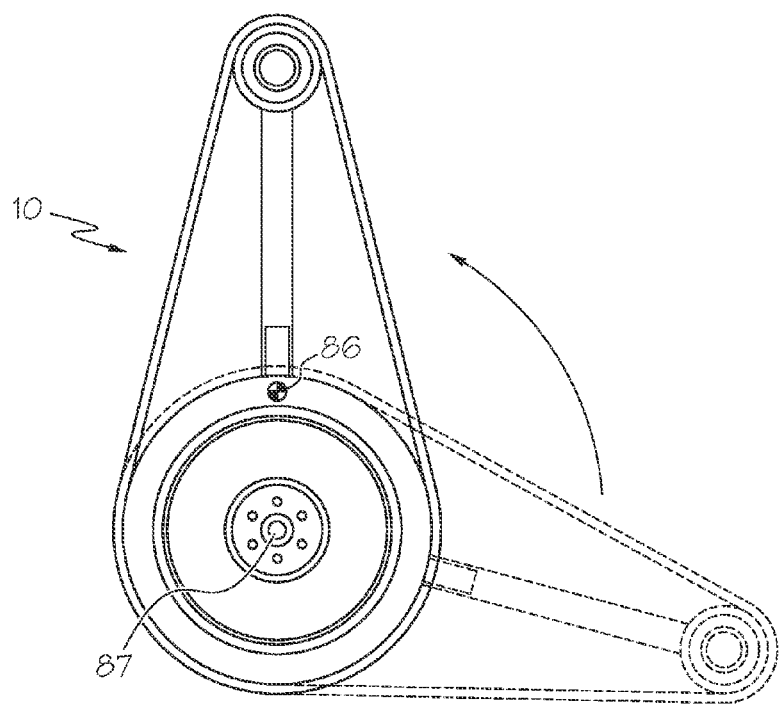
FIG. 6B is a free body diagram which illustrates the forces acting on the robot of FIG. 1 as the robot transitions to dynamically balanced (wheeled) operation.
Figure 7A:
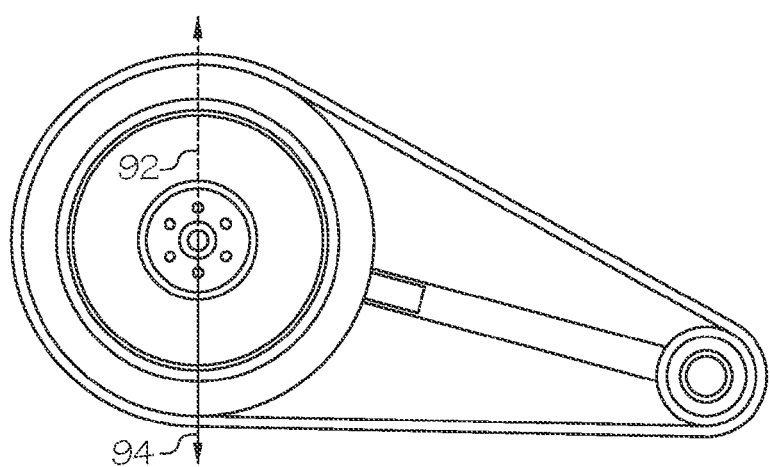
FIG. 7A is a free body diagram which illustrates how the vertical reference vector is modified by the methods of FIG. 5; and, FIG. 7B is a free body diagram which illustrates the location of the vertical reference vector during dynamically balanced (wheeled) operation of the robot of the present invention according to several embodiments.
Figure 7B:
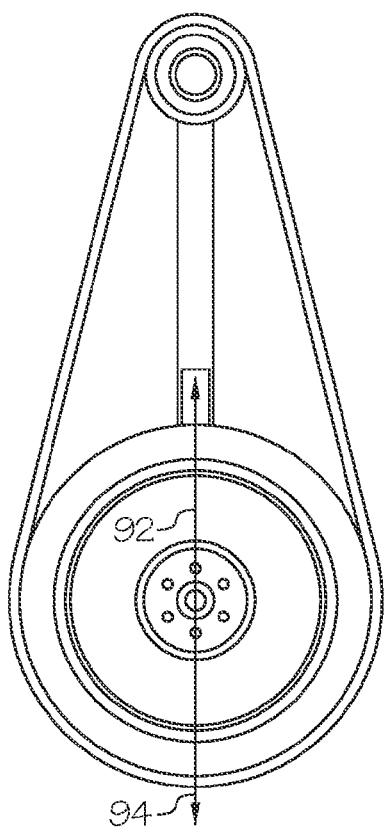

Referring now to FIGS. 6A-7B, once the robot 10 "pitches forward" as described above, in order for the robot 10 to remain dynamically balanced in a vertical position, the center of gravity 86 must be kept directly above the wheel axis 87 of the robot (in FIGS. 6A-6B, axis 87 is coming out of the page). Incidentally, and referring now to FIGS. 7A and 7B, this also causes a vertical reference vector that extends from axis 87 to center is gravity 86 to be vertical. The internal control system can dynamically balance robot 10 by tracking vertical reference vector 92 and can act to keep the vehicle's gravity vector 94 coincident with the vertical reference vector 92. This can typically be accomplished by a processor (not shown) that has non-transitory written instructions, that, when executed cause extremely minor accelerations and decelerations of the motor to keep the vertical reference vector 92 and gravity vector 94 coincident (and hence, dynamically balanced). For the present invention, the written instructions for the processor can be altered to modify the vertical reference vector so that it intersects with the revised center of gravity 86 with the track installed and the payload (not shown in the Figures) loaded onto the robot 10, as opposed to the pre-installation center of gravity 86'. With this configuration, when the robot 10 transitions from tracked mode (FIG. 6A) to dynamically balanced mode (FIG. 6B), the robot can remain dynamically balanced once balance vector is vertical, i.e., when the revised center of gravity 86 is above the wheel axis 87. Stated differently, the feedback system can be modified to account for the revised center of gravity due to installation of the kit.

The tread on the tracks 12 can be selected if the operational environment (the terrain) is known, to enable the maximum operational performance of robot 10 over a wide variety of terrain, in addition to distributing the vehicle's weight over a larger ground foot print. Retaining the ability to balance during tracked operation can provide the robot with a unique versatility, the ability to overcome obstacles larger than the radius of the wheel because of the tracks, but greater speed and mobility, because of the wheels.

With respect to alternative embodiments of the present invention, the angle of the tracks relative to the chassis could be controllable, so that the size of the vehicle's footprint could be changed without removing the tracks. Other methods of varying the footprint of the tracks and/or establishing tension in the tracks during installation are possible, such as providing a telescoping strut, for example. Methods of tensioning the track could be manufactured that don't rely on the air pressure of the wheel, such as a spring-loaded idler or piston-loaded idler could also be incorporated into the design. The design can be easily modified for different track and idler types/combinations. Additionally, multiple varying payloads could be installed on the system, which can greatly increase its capabilities.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A dynamically balanced robot, said robot comprising:
    a body;
    at least one wheel rotatably mounted to said body on a body axis;
    at least one strut extending from said body;
    at least one idler wheel mounted to an end of said strut distal to said body;

a track slipped over said at least one wheel and said at least one idler wheel, said track frictionally engaging said at least one wheel and said at least one idler wheel; and, said robot having a vertical reference vector and a revised center of gravity due to installation of said at least one strut, said at least one idler wheel and said track, wherein said robot is switchable between wheeled operation and tracked operation during operation of the robot; and, a processor, said processor containing non-transitory written instructions that, when accomplished, maintain said vertical reference vector parallel to a vector defined by said axis and said revised center of gravity during said wheeled operation;

wherein said end of said at least one strut distal to said body is u-shaped, said at least one idler wheel is fixed inside said end of said at least one strut distal to said body, and the robot further comprises at least one other idler wheel fixed outside said end of said at least one strut distal to said body.

2. A kit for converting a dynamically balanced wheeled robot to a dynamically balanced tracked robot, said dynamically balanced robot having a vertical reference vector, a body and at least one wheel mounted to an axis that is rotatably mounted to said body, said kit comprising:

at least one strut having a first end fixed to said body and a second end;

at least one idler wheel fixed to said second end;

a track slipped over said at least one wheel and said at least one idler wheel, said track frictionally engaging said at least one wheel and said at least one idler wheel;

said robot having a revised center of gravity and being switchable between wheeled operation and tracked operation during operation once said at least one strut, said at least one idler wheel and said at least one track are installed; and, a processor, said processor containing non-transitory written instructions that, when accomplished, maintain said vertical reference vector parallel to a vector defined by said axis and said revised center of gravity during wheeled operation of said robot;

wherein said second end of said at least one strut is u-shaped, said at least one idler wheel is fixed inside said second end of said at least one strut, and the kit further comprises at least one other idler wheel fixed outside said second end of said at least one strut.

3. A method for converting a dynamically balanced, wheeled robot to a tracked robot, said robot having a chassis, an axis rotatably mounted to said chassis, at least one wheel mounted to said axis, a pre-installation center of gravity and a vertical reference vector, said method comprising the steps of:

A) providing a strut having a proximal end and a u-shaped distal end;

B) rotatably attaching at least one idler inside said u-shaped strut distal end and rotatably attaching at least one other idler outside said u-shaped strut distal end;

C) attaching said proximal end of said strut to the original chassis of said robot;

D) deflating the tires of said robot;

E) slipping a track over said strut and said wheel so that said track frictionally engages said tire and said idler, said robot having a revised center of gravity once said step E) is accomplished;

F) inflating said tires; and,

G) aligning said vertical reference vector that said vertical reference vector is coincident with a vector defined by said axis and said revised center of gravity, wherein said robot, such that said robot is switchable between wheeled operation and tracked operation during operation of said robot.

\* \* \* \* \*